March 27, 1951  S. B. CRARY  2,546,725
PHASE BALANCING APPARATUS
Filed Oct. 29, 1949
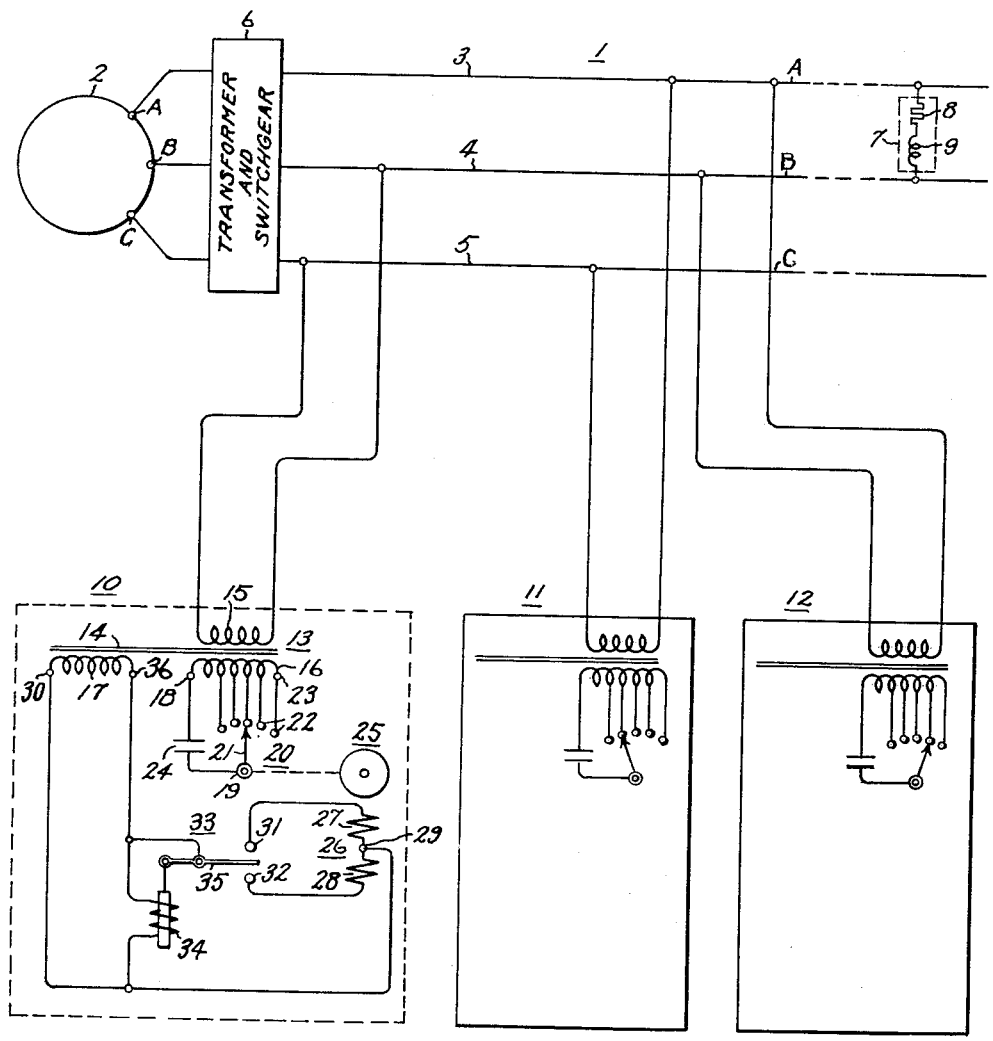
Inventor:
Selden B. Crary,
by Ernest F. Britton
His Attorney.

UNITED STATES PATENT OFFICE 2,546,725

PHASE BALANCING APPARATUS

Selden B. Crary, Schenectady, N. Y., assignor to General Electric Company, a corporation of New York Application October 29, 1949, Serial No. 124,410

4 Claims. (Cl. 171—97)

This invention relates to electrical supply systems and more particularly to a static impedance and individually variable tap transformer phase balancing apparatus for use in polyphase supply systems.

The general principles of balancing phase voltages and currents in polyphase supply systems by the use of capacitive and inductive reactances are well known. In the case of unbalanced loading on a polyphase system, as for example due to a substantial single-phase load, such reactances may be connected across the various phases of the supply to provide components of current which combine with otherwise unsymmetrical currents produced by unbalanced loading, to provide substantially symmetrical currents in the phase lines. Thus by the use of single-phase impedances connected across individual phases it is possible to correct the voltages along the line of an unbalanced supply system and at the same time to effect a balancing of the currents and loads between phases.

A particular advantage of such balancing is the reduction in negative-phase sequence currents which may be required to flow in a polyphase transmission system and more particularly in rotating generating apparatus associated therewith due to unbalanced loading of the system. By reducing negative-phase sequence current to a minimum a substantial reduction in amortisseur winding heating in the rotating machine may be effected.

It is the principal object of my invention to provide a new and improved individually variable tap transformer apparatus for balancing the currents and voltages in polyphase transmission systems by the use of static impedance elements.

In accordance with a preferred embodiment of my invention, I provide a number of single-phase transformers each connected across a phase of a polyphase transmission system and each arranged to impress a voltage, adjustable through a tap-changing arrangement, on a suitable reactance. By adjusting, either manually or automatically, the tap voltages impressed on the individual reactances, reactive currents are provided which combine with load currents to effect balanced conditions of current and voltage between the phases of the transmission system.

The invention will be better understood from a consideration of the following description taken in connection with the accompanying drawing and the appended claims, in which the features of the invention believed to be novel are more particularly set forth.

Referring now to the single figure of the drawing, there is shown a polyphase supply system comprising a transmission system 1 connected to an electrical source represented as a three-phase generator 2 having output terminals designated as A, B and C. Transmission system 1 has phase lines 3, 4 and 5 which are connected to phases A, B and C, respectively, of generator 2 through suitable transformer and switchgear apparatus 6.

A single-phase load impedance 7 represented as including a resistance 8 and an inductive reactance 9 is shown connected to phases A and B of transmission system 1. It is assumed that load impedance 7 is located at a considerable distance from generator 2 and that accordingly transmission system 1 is relatively great in length. Load 7, due to the power limitations of generator 2 and the relatively great length of transmission system 1, causes a considerable unbalance in the voltages of lines 3, 4 and 5. Such unbalanced loading likewise causes an unbalance of the currents in phases A, B and C and in the windings of generator 2.

In accordance with my invention I provide substantially identical compensating devices 10, 11 and 12 connected across phase voltages BC, CA, and AB respectively of transmission system 1 at the vicinity of single-phase load 7 or at the point where balancing action is desired, to compensate for the unbalance created by load 7. Since devices 10, 11 and 12 are substantially identical, it will be understood that the following description of device 10 is intended to serve also as a description of devices 11 and 12.

Device 10 comprises a transformer 13 having a magnetic core 14, a primary winding 15, a main secondary winding 16, and an auxiliary secondary winding 17. Winding 15 is connected to lines 4 and 5 of system 1 or across phase voltage BC thereof. Main secondary winding 16 is provided with a pair of output terminals 18 and 19. Terminal 18 may conveniently be one extremity of winding 16. Terminal 19 is arranged to tap winding 16 at various points thereof by the use of a suitable tap-switching mechanism 20 comprising a switch arm 21 and a plurality of taps 22 connected to the other extremity 23 of winding 16 and various intermediate points between extremities 18 and 23.

A reactance element represented as a capacitive reactance 24 is connected between output terminals 18 and 19 of winding 16. As switch arm 21 is caused to make contact with the various taps 22 of winding 16 the voltage impressed on capacitive reactance 24 is caused to be varied.

Tap-switching mechanism 20 is operated by a reversible motor 25 supplied with power from auxiliary secondary winding 17. Motor 25 is provided with a split-series field 26 having opposite portions 27 and 28 joined at a common point 29 which is connected to one extremity 30 of winding 17.

The free ends of field members 27 and 28 are connected to contacts 31 and 32 of a contact-making voltmeter 33. Voltmeter 33 has a potential coil 34 connected across winding 17, and a movable pointer 35 responsive to the magnetic forces of potential coil 34. Pointer 35 serves as a movable contact which is connected to extremity 36 of winding 17. Pointer 35 is arranged to engage either contact 31 or contact 32 to complete the circuit from winding 17 through either field member 27 or 28, respectively, to cause forward or reverse rotation of motor 25.

It will be understood that transformers 13 forming elements of compensating devices 10—12 as herein embodied may be automatic tap-changing regulating transformers of a well known conventional type. The manner in which such a tap-changing transformer is constructed is not a part of my invention and accordingly various auxiliary devices conventionally used in automatic tap-changing transformers, such as limit switches for motor 25 and an adjusting mechanism for contact-making voltmeter 33, are not shown in the drawing.

In acting to balance the loads and voltages in transmission system 1, compensating devices 10—12 act as regulating devices responsive to the voltages impressed upon the primary windings 15 thereof. In particular, considering now the operation of device 10, the voltage impressed on coil 34 of contact-making voltmeter 33 is proportional, by the ratio of the turns of winding 17 to the turns of winding 15, to phase voltage BC. Contact-making voltmeter 33 is adjusted by a conventional adjusting mechanism associated therewith (not shown) to the average value of the voltage of the three phases of system 1.

Accordingly, when the voltage impressed on coil 34 differs from the set voltage, pointer 35 engages contact 31 or 32 to cause excitation of field winding 27 or 28 and rotation of motor 25. When phase voltage BC is lower than the average phase voltage, motor 25 is arranged to rotate switch arm 21 in a direction to increase the voltage impressed on capacitive reactance 24, thereby increasing the reactive current therein. Thus an increase is provided in the reactive current component in lines 4 and 5. Similarly devices 11 and 12 cause changes to be provided in the reactive components in lines 3 and 5 and lines 3 and 4, respectively, through the regulating action of transformers 13 and the tap-changing mechanisms associated therewith.

In general tap-changing mechanisms 20 of devices 10, 11 and 12 do not have identical settings in a steady-state condition of system 1. In other words, as shown in the drawing, switch arm 21 may be adjusted to the center tap of winding 16 of device 10 while arm 21 of device 11 may be adjusted to a tap below the center tap, and to a tap above the center tap in the case of device 12. The position of arm 21 for a particular device such as device 10 is solely determined by the regulating action of contact-making voltmeter 33 and motor 25 associated therewith in accordance with well known principles. It will be understood that devices 10, 11 and 12 act independently and in each case an attempt is made to cause the phase voltage impressed on a particular compensating device to be brought to the average value of phase voltage to which the contact-making voltmeter is adjusted.

A voltage correction taking place in system 1 by action of devices 10, 11 and 12 results from the combination of the reactive components of current provided by devices 10, 11 and 12 and the load currents provided by load 7. It is well known that if a balance is effected in the phase currents in a system such as system 1, then a balance of the phase voltages is likewise obtained. Furthermore, by balancing the currents in system 1, a reduction is obtained in the negative-phase sequence currents flowing therein and in generator 2, thereby reducing the amortisseur winding heating in generator 2. Thus by the use of compensating devices in accordance with my invention, a regulating action is obtained along the lines of an unbalanced transmission system, together with a balancing of currents and loads between phases, and a reduction of negative-phase sequence currents.

While I have shown in the embodiment herein described a number of single-phase tap-changing transformers of conventional type in combination with capacitive reactances, it will be understood that my invention is not limited to the use of single-phase transformers or capacitive reactances. Under certain conditions it may be desirable to make use of inductive reactances, or a combination of capacitive or inductive reactances in the various phases. Furthermore, it may be desirable to employ other types and arrangements of adjustable voltage transformers, such as polyphase transformers having individual tap-changing mechanisms for the various phases.

While I have shown and described a preferred embodiment of my invention, it will be understood that my invention may well take other forms and I, therefore, aim in the appended claims to cover all such changes and modifications as fall within the true spirit and scope of the invention.

What I claim as new and desire to secure by Letters Patent of the United States is:

1. In a polyphase electrical transmission system having an unbalanced load connected thereto, transformer means associated with the phases of said system and having an adjustable tap voltage corresponding to each of said phases, a reactive element associated with each of said phases and connected to the transformer tap voltage corresponding thereto, and means to adjust said tap voltages individually to provide reactive currents in said system to tend to balance the phase voltages and currents therein.

2. In a polyphase electrical transmission system having an unbalanced load connected thereto, transformer means associated with the phases of said system and having an adjustable tap voltage corresponding to each of said phases, a capacitive reactance element associated with each of said phases and connected to the transformer tap voltage corresponding thereto, and means to adjust said tap voltages individually to provide reactive currents in said system to tend to balance the phase voltages and currents therein.

3. In a polyphase electrical transmission system having an unbalanced load connected thereto, transformer means associated with the phases of said system and having an adjustable tap voltage corresponding to each of said phases, an inductive reactance element associated with each of said phases and connected to the transformer tap voltage corresponding thereto, and means to adjust said tap voltages individually to provide reactive currents in said system to tend to balance the phase voltages and currents therein.

4. In a polyphase electrical transmission system having an unbalanced load connected thereto, a separate transformer associated with each phase of said system and having an adjustable voltage tap, a reactance element connected through the adjustable voltage tap of the corresponding transformer with each of said phases, and automatic means to adjust said voltage taps individually to provide reactive currents in said system to tend to balance the phase voltages and currents therein.

SELDEN B. CRARY.

REFERENCES CITED

The following references are of record in the file of this patent:

UNITED STATES PATENTS

| Number | Name | Date |
|---|---|---|
| 1,551,270 | Slepian | Aug. 25, 1925 |
| 1,658,980 | Fortescue | Feb. 14, 1928 |